United States Patent [19]

Sasaki et al.

[11] 4,130,255
[45] Dec. 19, 1978

[54] PASSENGER RESTRAINING BELT RETRACTOR

[75] Inventors: Shiro Sasaki; Jun Yasumatsu, both of Toyota; Kazuhisa Tatematsu, Nagoya, all of Japan

[73] Assignee: Toyota Jidosha Kogyo Kabushiki Kaisha, Aichi, Japan

[21] Appl. No.: 818,140

[22] Filed: Jul. 22, 1977

[30] Foreign Application Priority Data

Jul. 30, 1976 [JP] Japan .................. 51-102541[U]

[51] Int. Cl.² ...................... A62B 35/02; B65H 75/48
[52] U.S. Cl. .......................... 242/107.1; 242/107.4 R; 280/747
[58] Field of Search ............... 242/107–107.7; 280/744–747; 297/388

[56] References Cited

U.S. PATENT DOCUMENTS 3,375,495  3/1968  Burns .................. 242/107.4 R X
3,549,203  12/1970  Rawson ................ 242/107.1 X

FOREIGN PATENT DOCUMENTS 237466  9/1960  Australia .............. 242/107.4 R

Primary Examiner—Harvey C. Hornsby
Assistant Examiner—John M. Jillions
Attorney, Agent, or Firm—Koda and Androlia

[57] ABSTRACT

A passenger restraining belt retractor for winding up two restraining belts on a single retractor shaft of retractor one over the other including a base, a retractor shaft rotatably supported by the base for winding up the two belts thereon, a bail roller pressed by a bias means against the unrolled portions of the restraining belts which are wound up on the retractor shaft.

5 Claims, 5 Drawing Figures

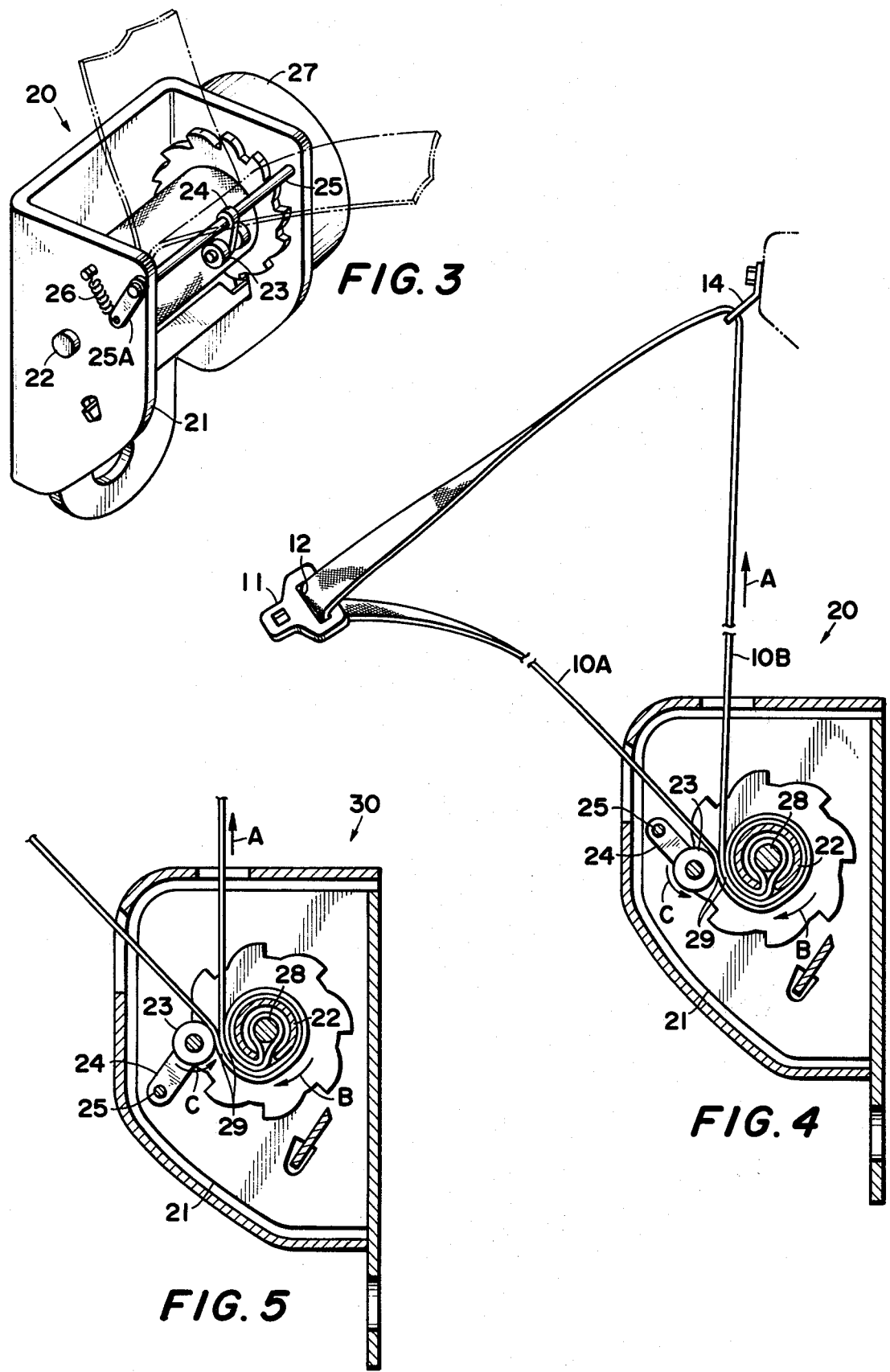

PASSENGER RESTRAINING BELT RETRACTOR

BACKGROUND OF THE INVENTION

1. Field of Invention

This invention relates to seat belt retractors and more particularly to seat belt retractors designed to wind up two restraining belts.

2. Prior Art

Three point passenger restraining devices consisting of lap and shoulder restraining belts are widely used as restraining systems for the purpose of restraining passengers during vehicle energencies such as collisions, etc. In these three point restraining devices, the useability and storeability of the restraining belts are improved by the installation of a retractor system which retracts, by a bias means those portions of the restraining belt not used by the passenger and the majority of both belts when the passenger is not using the restraining belts.

In such three point restraining devices, the installation of a separate restraining belt retractor for each of the lap and shoulder restraining belts is considered to be the most effective method of improving the useability and storeability of the belts. However, a restraining belt retractor system which winds up both restraining belts on a single retractor shaft one over the other without injuring the useability or storeability of the belts has been proposed.

As shown in FIGS. 1 and 2, the two belts retracting type of restraining belt retractor system is designed as follows: The lap restraining belt 10A and the shoulder restraining belt 10B are formed by a single continuous belt which is folded back through an opening 12 in a tongue plate 11. The lap restraining belt 10A and the shoulder restraining belt 10B, which is drawn upwards and is inserted through the slip joint 14 fastened to the upper portion of the side wall of a motor vehicle 13, are wound up on retractor 15. Retractor 15 is fastened to the lower portion of the side wall of a vehicle 13 and is designed so that the lap restraining belt 10A and the shoulder restraining belt 10B are wound up on a single retractor shaft 16 one over the other.

The passenger sitting in the seat 17 puts the three point restraining device into use by engaging the tongue plate 11 with the buckle 18 which is anchored at the approximate center line of the vehicle 13.

The use of said two belts retracting type of restraining belt retractor system makes it possible to simultaneously extend both restraining belts by pulling either one of the restraining belts out of the retractor 15. Furthermore, since one continuous restraining belt is folded back through the tongue plate 11, it is possible to adjust the relative length of each belt so that the lap restraining belt 10A and the shoulder restraining belt 10B are both constantly maintained at an appropriate length for use. Accordingly, such a system has offered superior useability and handling in spite of the fact that only a single retractor is employed.

However, in this two belts retracting type of retractor system, although the lap restraining belt is simultaneously extended when the passenger pulls out only the shoulder restraining belt, there is a possibility that the lap restraining belt will become slack inside the retractor mechanism due to the fact that there is no tension acting upon it (as shown by the broken line in FIG. 2).

A restraining belt in which such slack has been generated may become stuck inside the retractor mechanism or may interfere with the operation of the lock bar 19 which is for instantly stopping the rotation of the retractor shaft in the direction of belt extension during a vehicle emergency. There is also a danger in extreme cases that slack will be generated in one of the restraining belts while it is in use, thereby having a deleterious effect upon the restraining ability of the system so that secure restraint of the passenger is made impossible.

This invention has been designed with the aforementioned difficulties in mind.

SUMMARY OF THE INVENTION

Accordingly, it is a general object of the present invention to provide a passenger restraining belt retractor for retracting two restraining belts which prevents the formation of slack in the retractor.

It is another object of the present invention to provide a passenger restraining seat belt retractor for retracting two restraining belts which is simple, easy to manufacture and low in cost.

In keeping with the principles and objects of the present invention, the objects are accomplished by a unique passenger restraining belt retractor for retracting two restraining belts on a single retractor shaft one over the other including a base, retractor shaft rotatably supported by the base and for winding up the two belts thereon and two restraining belts and a bias means resiliently engaging with and pressing an unrolled portion of said restraining belts against the wound up portions thereof. Thus the generation of slack in the belts is prevented.

BRIEF DESCRIPTION OF THE DRAWINGS

The above mentioned and other features and objects of the present invention will become more apparent by reference to the following description taken in conjunction with the accompanying drawings, wherein like reference numerals denote like elements and in which:

FIG. 3 is an oblique view of one embodiment of a passenger restraining belt retractor in accordance with the teachings of the present invention;

FIG. 4 is a cross-section of the embodiment of FIG. 3; and

FIG. 5 is a cross-section of a second embodiment of a passenger restraining belt retractor in accordance with the teachings of the present invention.

DESCRIPTION OF THE INVENTION

Figure 1:
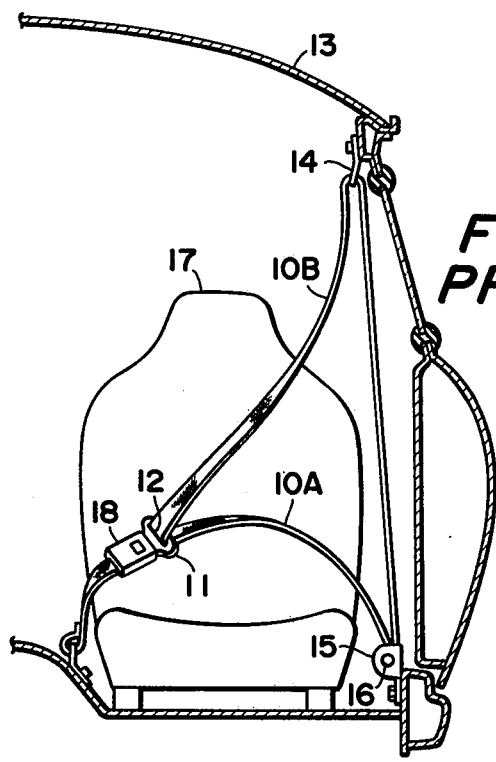
FIG. 1 is a partial cross-sectional view of a passenger restraining belt retractor of the prior art.
Figure 2:
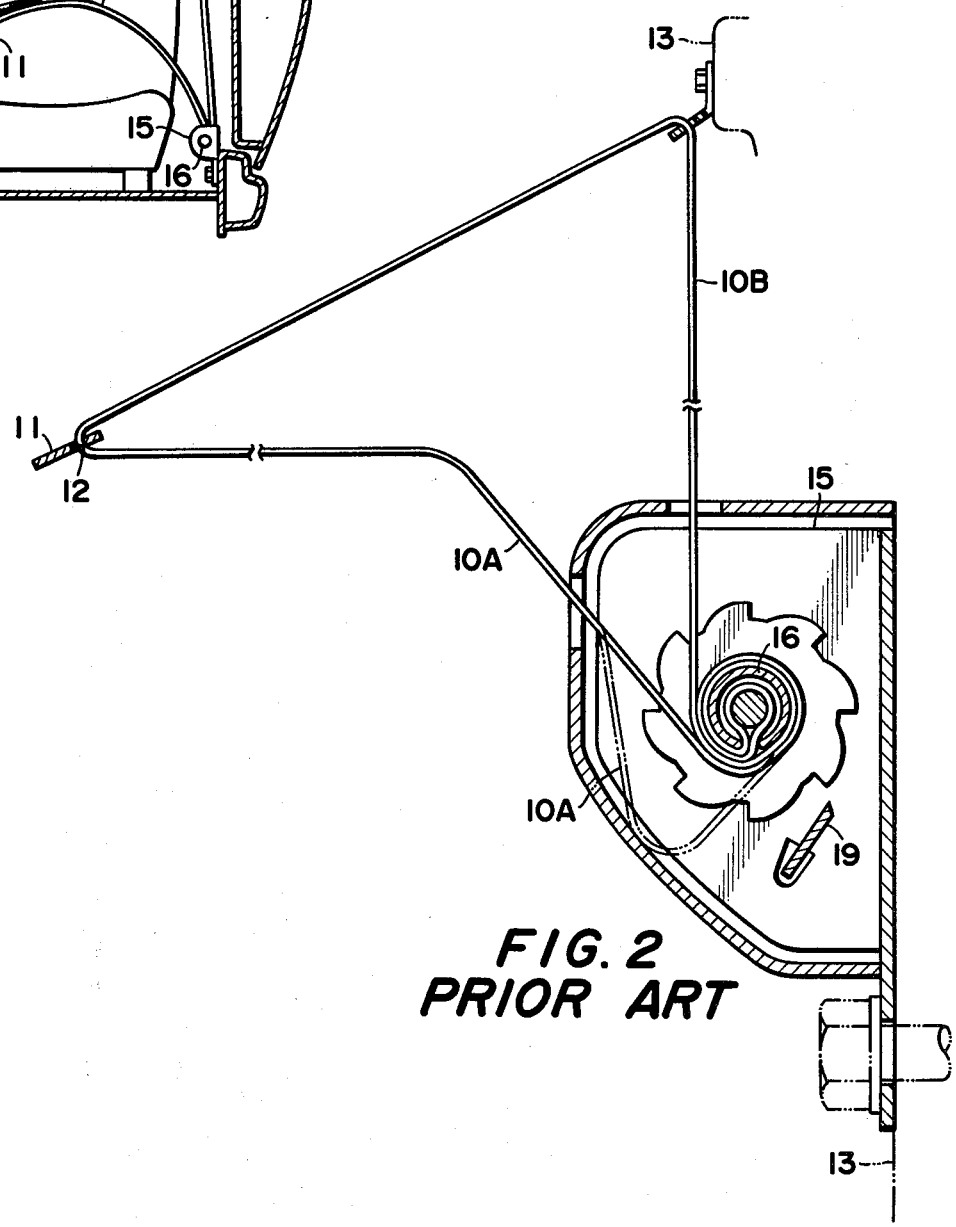
FIG. 2 is a cross-sectional view of a conventional retractor mechanism of the prior art.

Referring more particularly to the drawings, in FIGS. 3 and 4 is shown one embodiment of a passenger restraining belt retractor in accordance with the teachings of the present invention. In FIGS. 3 and 4, the passenger restraining belt retractor 20 includes a base 21, a retractor shaft 22 rotatably mounted on the base 21, two restraining belts 10A, 10B, second bias means resiliently engaging with and pressing an unrolled portion of said restraining belts 10A, 10B against the wound up portions thereof. The second bias means is a bail roller means being rotatably supported by said base 21. The bail roller means comprises a roller shaft 25 rotatably supported by said base 21, first arm 24 fixed to said roller shaft 25, a bail roller 23 rotatably coupled to said first arm 24, a second arm 25A fixed to one of said roller shaft 25 and a spring 26 coupled between the end of said second arm 25A and said base 21.

As in prior art models, the base 21 is bent into a U shape so that it supports both ends of retractor shaft 22. The first bias means mounted between said base 21 and said retractor shaft 22 for biasing said retractor shaft 22 in the direction of belt retraction is a coil spring 27.

Lap restraining belt 10A and shoulder restraining belt 10B are secured to the center of retractor shaft 22 by a locking pin 28 and are wound up around the circumference of retractor shaft 22 one over the other. The lap restraining belt 10A and the shoulder restraining belt 10B respectively cross over the lap and shoulder of the passenger and are formed in the same manner as in a conventional device by a single continuous belt which is folded back through a tongue plate 11. The bail roller 23 together with the first arm 24, roller shaft 25, the second arm 25A and spring 26 is arranged and configured such that it is pressed by the force of spring 26 towards the approximate center of the retractor shaft 22. The portion of the bail roller 23 which is pressed towards the retractor shaft 22 is designed so that it is pressed against the unrolled portions 29 of the lap restraining belt 10A and shoulder restraining belt 10B but which have not yet been extended toward the lap and shoulder over the passenger.

In operation, the shoulder restraining belt 10B moves in the direction of belt extension (as shown by the arrow A in FIG. 4) through the slip joint 14 when the passenger grasps the shoulder restraining belt 10B and pulls it across his body in order to put the restraining belt into use. Accordingly, the retractor shaft 22 is caused to rotate against the tension of coil spring 27 in the direction indicated by the arrow B. This causes an impelling force in the direction of extension from the retractor shaft 22 to be applied to the lap restraining belt 10A which is pressed by the bail roller 23 in the same manner as the shoulder restraining belt 10B. Accordingly, the lap restraining belt 10A will be extended exactly the same amount as the shoulder restraining belt 10B. Furthermore, since in this case the bail roller 23 is free to rotate relative to the first arm 24, the bail roller 23 will rotate in the direction indicated by the arrow C so there will be no great resistance to the force extending the restraining belts 10A and 10B. Accordingly, the passenger is easily able to pull the restraining belts out. Furthermore, there will be no great reduction in the retracting force of the coil spring 27 during the retraction of the restraining belts onto the retractor shaft 22. Accordingly, both belts will be securely rolled up on the retractor shaft 22.

Referring to FIG. 5, shown therein is a second embodiment of a retractor assembly in accordance with the teachings of the present invention. Since the restraining belt retractor in FIG. 5 is similar to that of FIGS. 3 and 4, like elements will be given like reference numerals and description of their interconnection and operation will be omitted.

In the second embodiment of FIG. 5, the construction of the passenger restraining belt retractor 30 is approximately the same as that in the first embodiment of FIGS. 3 and 4. However, in the first embodiment the first arm 24 is swung in a counter-clock direction to press the bail roller 23 toward the retractor shaft 22, while in the second embodiment the first arm 24 is driven in a clockwise direction so that it presses the bail roller 23 against the unrolled portions 29 of both restraining belts 10A and 10B rolled up on the retractor shaft 22.

Similar to the first embodiment, in operation, extending the shoulder restraining belt 10B causes the lap restraining belt 10A to be simultaneously extended exactly the same amount from the retractor shaft 22. Accordingly, there is no danger of slack in the lap restraining belt 10A inside the retractor mechanism 30.

Furthermore, in both the above described embodiments, the lap restraining belt 10A was described as being forceably extended when the passenger extended the shoulder restraining belt 10B. However, extending the lap restraining belt 10A will in like manner cause the shoulder restraining belt 10B to be forceably extended.

As has been described above, the passenger restraining belt retractor provided in accordance with the teachings of the present invention presses a bail roller against the unrolled portions of the passenger restraining belts wound up on a single retractor shaft 22 one over the other so that if one of the restraining belts is pulled out, the other restraining belt will be forceably extended. This invention, therefore, has the superior effect of eliminating any danger of slack in the restraining belts inside the retractor mechanism.

In all cases it is understood that the above described embodiments are merely illustrative of but a small number of the many possible specific embodiments which can represent applications of the principles of the present invention but numerous and other varied arrangements can be readily devised in accordance with these principles by those skilled in the art without departing from the spirit and scope of the present invention.

We claim:
1. A restraining belt retractor comprising:
   a base;
   a retractor shaft rotatably supported by said base;
   two restraining belts secured to said retractor shaft;
   first bias means mounted between said base and said retractor shaft for biasing said retractor shaft in the direction of belt retraction; and
   second bias means resiliently engaging with and pressing an unrolled portion of said two restraining belts against the wound up portions thereof for preventing slack in the belts whereby said two restraining belts are extended substantially the same amount.

2. A retractor according to claim 1 wherein the second bias means is a bail roller means being rotatably supported by said base.

3. A retractor according to claim 2 wherein the bail roller means comprises:
   a roller shaft rotatably supported by said base;
   a first arm fixed to said roller shaft;
   a bail roller rotatably coupled to said first arm;
   a second arm fixed to one end of said roller shaft; and
   a spring coupled between the end of said second arm and said base.

4. A retractor according to claim 1 wherein said two restraining belts formed by a single continuous belt folded back through an opening in a tongue plate.

5. A retractor according to claim 1 wherein said base is of generally U shape in cross-section.

* * * * *